No. 748,010. PATENTED DEC. 29, 1903.
S. G. REED.
PRESSURE WEIGHING MACHINE.
APPLICATION FILED MAY 11, 1903.
NO MODEL. 3 SHEETS—SHEET 1.

Witnesses:
W. L. Williams
Henry W. Dunn

Inventor:
Samuel G. Reed
by Ralph W. Foster, Atty.

No. 748,010. PATENTED DEC. 29, 1903.
S. G. REED.
PRESSURE WEIGHING MACHINE.
APPLICATION FILED MAY 11, 1903.
NO MODEL. 3 SHEETS—SHEET 2.

Witnesses:
W. L. Williams
Henry W. Dunn

Inventor:
Samuel G. Reed
by Ralph W. Foster, Atty.

No. 748,010. PATENTED DEC. 29, 1903.
S. G. REED.
PRESSURE WEIGHING MACHINE.
APPLICATION FILED MAY 11, 1903.
NO MODEL. 3 SHEETS—SHEET 3.
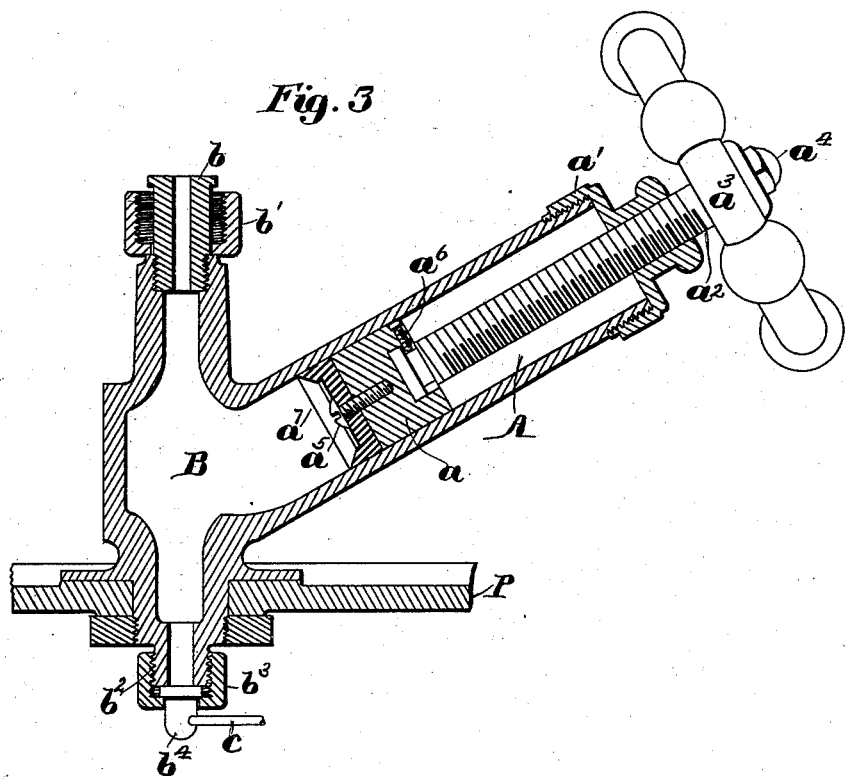
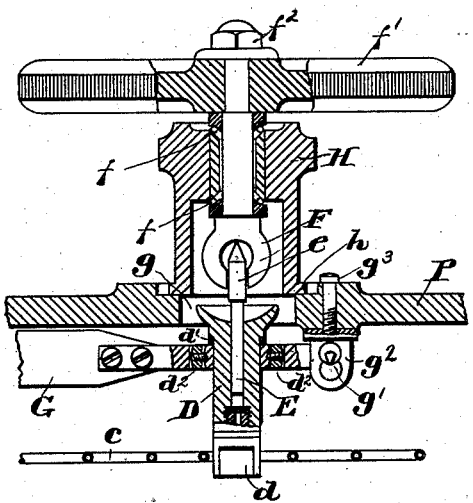
Witnesses:
W. L. Williams
Henry W. Dunn
Inventor:
Samuel G. Reed
by Ralph W. Foster, Atty.

No. 748,010. Patented December 29, 1903.

UNITED STATES PATENT OFFICE.

SAMUEL G. REED, OF PORTLAND, OREGON, ASSIGNOR TO CROSBY STEAM GAGE AND VALVE COMPANY, OF BOSTON, MASSACHUSETTS, A CORPORATION OF MASSACHUSETTS.

PRESSURE-WEIGHING MACHINE.

SPECIFICATION forming part of Letters Patent No. 748,010, dated December 29, 1903.

Application filed May 11, 1903. Serial No. 156,519. (No model.)

*To all whom it may concern:*

Be it known that I, SAMUEL G. REED, a citizen of the United States, residing at Portland, in the county of Multnomah and State of Oregon, have invented certain new and useful Improvements in Pressure - Weighing Machines, of which the following is a specification.

My invention relates to pressure-weighing machines; and its object is to provide a machine less cumbersome and more easily operated and adapted to weigh higher pressures than those machines now or heretofore in use.

To the present time it has been customary to measure these pressures by weights placed directly upon a piston against which the pressure acts. This method requires the use of many weights and their various combinations and constant handling to secure the desired readings for the gage or other instrument whose pressures are being measured. I avoid this difficulty by doing away altogether with these numerous weights and employing in lieu thereof a lever-scale on the principle of the steelyard. To accomplish this, I employ the mechanism illustrated in the accompanying drawings, in which—

Figure 1:
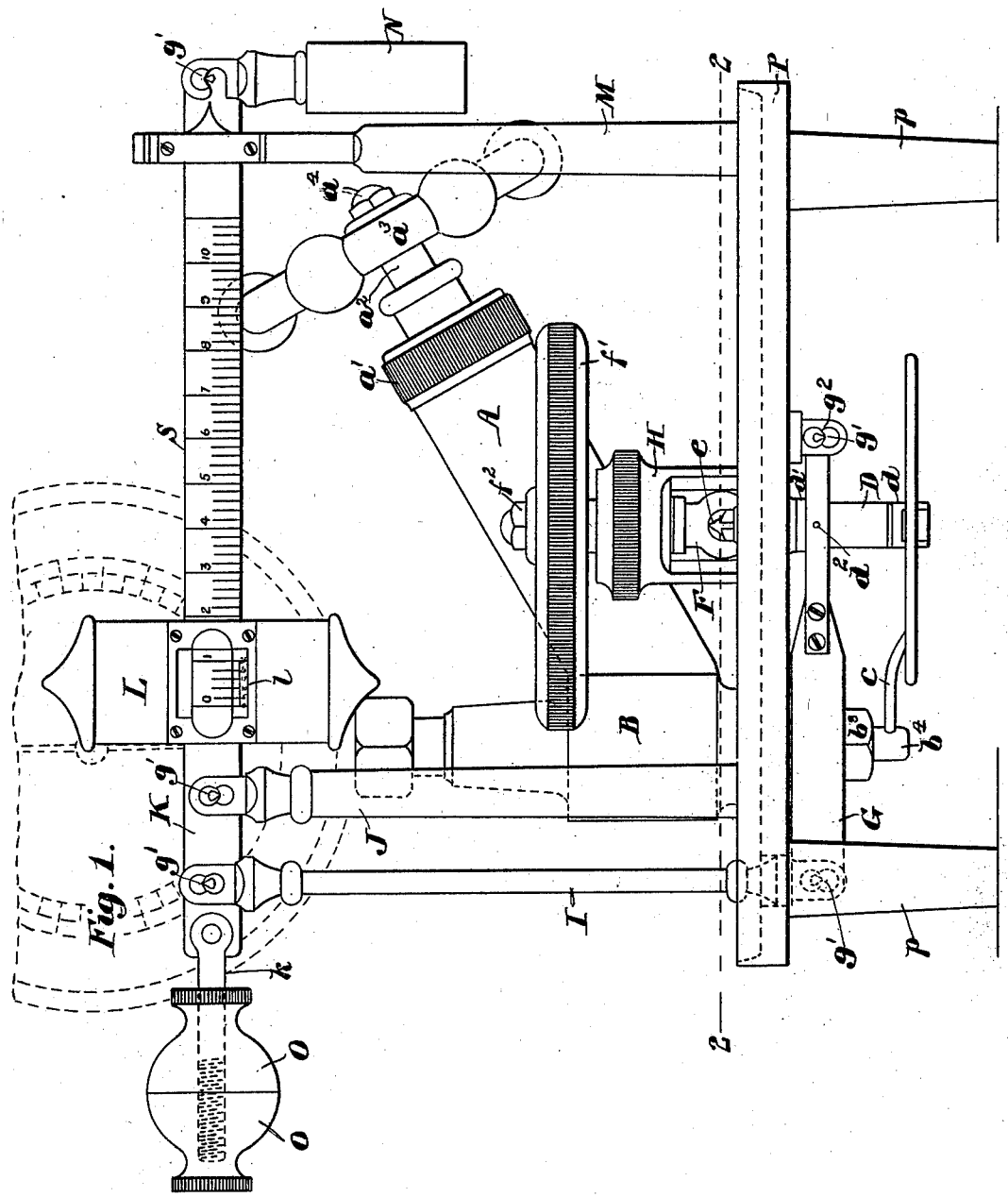
Figure 2:
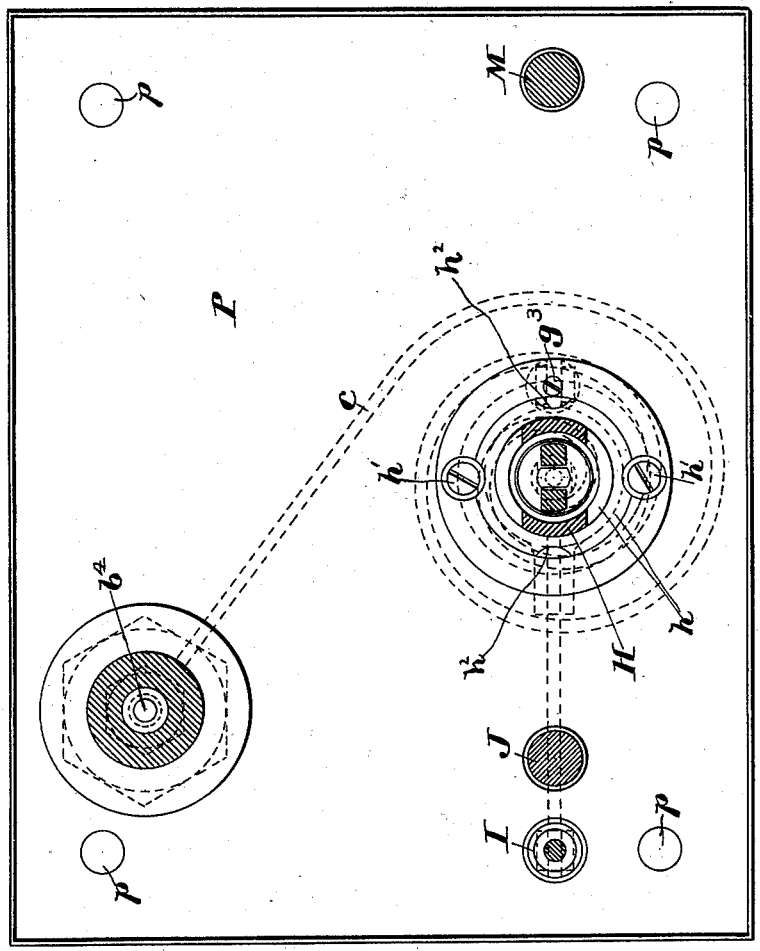

Figure 1 is a front elevation of the apparatus or machine, showing a gage in dotted lines. Fig. 2 is a plan view of the bottom of the apparatus. Fig. 3 is a sectional view of the reservoir, plunger-piston, gage-support, and copper pipe. Fig. 4 is a sectional view of the piston and cylinder employed to operate the lever-scale.

Similar letters refer to similar parts throughout the several views.

The table P, with its legs $p\ p$, constitutes the framework of the machine, and secured thereto are the reservoir B, the rotary shaft F, the lever G, and the lever-scale S. The reservoir B is furnished with the bushing $b$, to which is secured a gage (shown in dotted lines) to be tested by the coupling $b'$. The reservoir is furnished also with the threaded outlet $b^2$, to which is secured the copper pipe C by means of the coupling $b^3$ and connecting-piece $b^4$. The reservoir is furnished also with the tubular arm A, in which travels the plunger-piston $a$ and which is furnished with the threaded cap $a'$, through and in threaded engagement with which extends the piston-rod $a^2$, operated by the wheel $a^3$, affixed to its outer end and held in place by the nut $a^4$. The piston $a$ has attached to it a cup-shaped packing of elastic material $a^7$ by the screw $a^5$, and the piston-rod $a^2$ is held to the piston $a$ by the screw $a^6$. The coiled copper pipe C leads from the threaded outlet $b^2$ of the reservoir B beneath the table P into the cylinder D, being fastened to the cap $d$ on the lower end of said cylinder. This cylinder D is suspended by a shoulder $d'$ at its upper end in the gimbals $d^2$, mounted on the lever G, and extends through an opening $g$ in the table P. In this cylinder D fits the piston E with its enlarged, flattened, and pointed upper end $e$. The forked shaft F rotates on ball-bearings $f$ in the frame H and is rotated by the wheel $f'$, fixed to its upper end and held in place by the nut $f^2$. This frame H has an annular base $h$, which fits in a circular cut-out portion of the table and is therein secured by the binding-screws $h'$. This frame H is easily removed by rotating it until the notched portions $h^2$ of its annular base register with the binding-screws $h'$. The lever-scale is mounted upon the vertical standard J, fixed to the table P, and is operated by means of the link I and lever G. The counterbalance O is adjustable longitudinally on the threaded arm $k$, attached to the inner end of the scale-beam K, and is in two parts in order that it may be secured in its position by the jamming action obtained by screwing these two parts against each other. The outer end of the scale-beam extends through the slotted upper end of the vertical standard M, fixed to the table P, and is adapted to carry the weight N. The lever G is fulcrumed on the projection $g^2$, which is fastened to the table P by the screw $g^3$, and this lever G engages the link I, which extends upwardly through the table P and engages the scale-beam K. The lever G carries the gimbals $d^2$, attached thereto. The pea L is furnished with the vernier $l$. The bearings $g'$ are all of steel and knife-edged.

The operation of the machine is as follows: The lever-scale is properly adjusted by means of the counterbalance O. The plunger-piston $a$ is drawn to the outer end of the tubular arm A by rotating the wheel $a^3$. The reservoir B is then filled with fluid—i. e., oil—through the inlet $b$, and the fluid flows therefrom through the pipe C into the cylinder D, filling both pipe and cylinder. The instrument—i. e., a pressure-gage—whose pressure is to be weighed or measured is now secured to the bushing $b$, and the wheel $a^3$ is rotated, forcing the plunger-piston down through the tubular arm A and forcing the oil up into the said instrument—i. e., gage. The wheel is still further rotated, and the oil under pressure drives the piston E upward until its pointed upper end $e$ comes into contact with the lower forked end of the rotary shaft F, its flattened sides being in engagement with the flattened inner sides of such forked end. The pressure of the oil is increased by still further rotating the wheel $a^3$, and as the piston E can rise no higher the cylinder D is forced downward until its shoulder $d'$ rests upon the gimbals $d^2$ and forces downward the lever G, carrying the gimbals, and by means of the link I operates the scale-beam K. The weighing process is then the ordinary one, and the results obtained are marked upon the dial of the instrument whose pressures are being weighed or measured. The scale-beam K is marked or calibrated pursuant to a formula dependent upon the area of the piston E as a basis and its relation to the long and short arms of the scale-beam S and of the lever G. The flexibility of the coiled pipe C permits the cylinder D to rise and fall freely, while the gimbals permit the cylinder to maintain a vertical position. The forked shaft F provides for rotating the piston E in its cylinder, thereby overcoming friction. This forked shaft F also limits the vertical motion of the piston.

Having described my invention, what I claim, and desire to secure by Letters Patent, is—

1. In a pressure-weighing machine the combination, with a fluid-reservoir, a support for the instrument whose pressures are to be measured, and a plunger-piston, of a movable cylinder having a piston with means for limiting the vertical motion of such piston, and a pipe leading from said reservoir to said movable cylinder; substantially as described.

2. In a pressure-weighing machine the combination, with a fluid-reservoir, a support for the instrument whose pressures are to be measured, and a plunger-piston, of a movable cylinder having a piston with means for limiting the vertical motion of such piston and means for maintaining the vertical position of such cylinder, and a pipe leading from said reservoir to said movable cylinder; substantially as described.

3. In a pressure-weighing machine the combination, with a fluid-reservoir, a support for the instrument whose pressures are to be measured, and a plunger-piston, of a movable cylinder having a piston with means for limiting the vertical motion of such piston together with means for rotating said piston in said cylinder, and a pipe leading from said reservoir to said movable cylinder; substantially as described.

4. In a pressure-weighing machine the combination, with a fluid-reservoir, a support for the instrument whose pressures are to be measured, and a plunger-piston, of a movable cylinder having a piston with means for limiting the vertical motion of such piston and means for maintaining the vertical position of such cylinder, together with means for rotating said piston in said cylinder, and a pipe leading from said reservoir to said movable cylinder; substantially as described.

5. In a pressure-weighing machine the combination, with a fluid-reservoir, a support for the instrument whose pressures are to be measured, and a plunger-piston, of a movable cylinder having a piston with means for limiting the vertical motion of such piston, a lever-scale operated by said cylinder, and a pipe leading from said reservoir to said movable cylinder; substantially as described.

6. In a pressure-weighing machine the combination, with a fluid-reservoir, a support for the instrument whose pressures are to be measured, and a plunger-piston, of a movable cylinder having a piston with means for limiting the vertical motion of such piston and means for maintaining the vertical position of such cylinder, a lever-scale operated by said cylinder, and a pipe leading from said reservoir to said movable cylinder; substantially as described.

7. In a pressure-weighing machine the combination, with a fluid-reservoir, a support for the instrument whose pressures are to be measured, and a plunger-piston, of a movable cylinder having a piston with means for limiting the vertical motion of such piston together with means for rotating said piston in said cylinder, a lever-scale operated by said cylinder, and a pipe leading from said reservoir to said movable cylinder; substantially as described.

8. In a pressure-weighing machine the combination, with a fluid-reservoir, a support for the instrument whose pressures are to be measured, and a plunger-piston, of a movable cylinder having a piston with means for limiting the vertical motion of such piston and means for maintaining the vertical position of such cylinder, together with means for rotating said piston in said cylinder, a lever-scale operated by said cylinder, and a pipe leading from said reservoir to said movable cylinder; substantially as described.

9. In a pressure-weighing machine the combination, with a fluid-reservoir, a support for the instrument whose pressures are to be measured, and a plunger-piston, of the movable cylinder D, piston E, rotary shaft F, pipe C, gimbals $d^2$ $d^2$, lever G, fulcrum $g^2$, link I, and lever-scale S; substantially as described.

10. In a pressure-weighing machine the combination, with a fluid-reservoir and means for compressing the fluid therein of the movable cylinder D, piston E, rotary shaft F, pipe C, gimbals $d^2$ $d^2$, lever G, fulcrum $g^2$, link I, and lever-scale S; substantially as described.

In testimony whereof I have affixed my signature in presence of two witnesses.

SAMUEL G. REED.

Witnesses:
T. J. KING,
C. J. SHIELDS.